United States Patent [19]

Johnston

[11] 4,349,499

[45] Sep. 14, 1982

[54] DISC RECORD PREPARATION

[75] Inventor: Samuel J. B. Johnston, Ashford, England

[73] Assignee: E M I Limited, Hayes, England

[21] Appl. No.: 215,258

[22] Filed: Dec. 11, 1980

[30] Foreign Application Priority Data

Dec. 21, 1979 [GB] United Kingdom ............... 7944236

[51] Int. Cl.³ ............................................ B29D 17/00
[52] U.S. Cl. ................................... 264/107; 425/810
[58] Field of Search ........................ 264/107; 428/810

[56] References Cited

U.S. PATENT DOCUMENTS 4,231,730 11/1980 Birt .................................. 425/810 X
4,238,179 12/1980 Llobres et al. .................. 425/810 X
4,243,367 1/1981 Renoux ........................... 425/810 X

FOREIGN PATENT DOCUMENTS 2410178 10/1975 Fed. Rep. of Germany.
596055 10/1925 France.

*Primary Examiner*—Thomas P. Pavelko
*Attorney, Agent, or Firm*—Fleit & Jacobson

[57] ABSTRACT

A method for manufacturing modulated disc records (i.e. video or audio records) including bonding a plastics material foil to the unmodulated face of a stamper plate before the stamper plate is secured between the rams of the record press. This method obviates the necessity for backsanding the stamper plate, as hitherto adopted procedure which was time consuming, unreliable and often hazardous.

5 Claims, 1 Drawing Figure

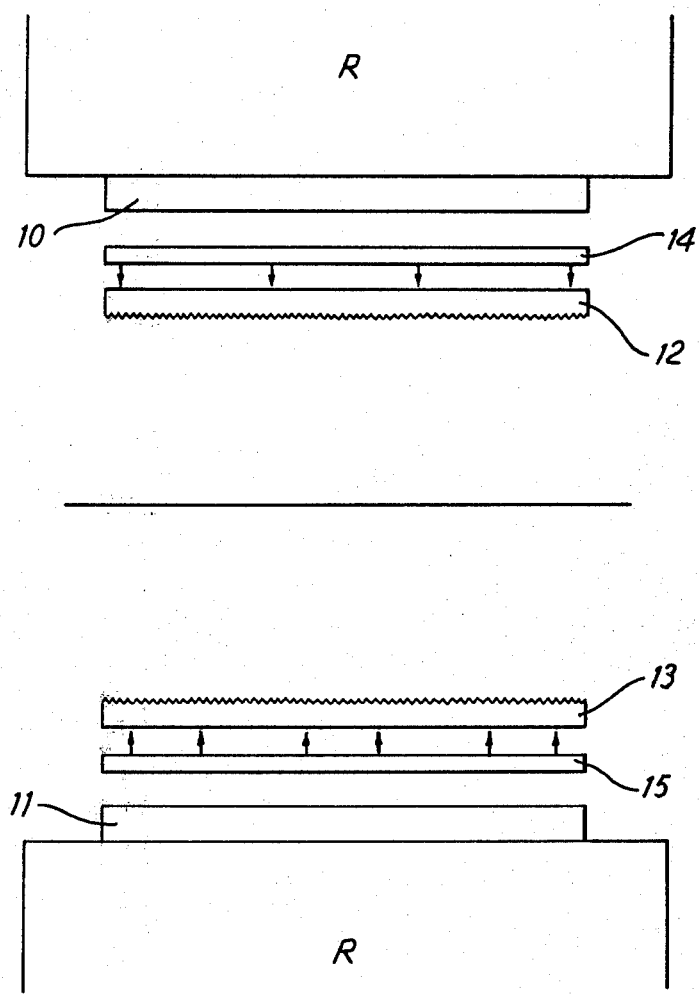

DISC RECORD PREPARATION

This invention relates to the pressing of disc records. As is known in the art audio, and latterly video discs may be produced by compressing a "shot" or "cake" of a molten plastics material between a pair of heated stamper plates. Each stamper plate is mounted on a respective mould block between the rams of a record press and at its inwardly facing surface bears a negative impression of the modulations representing the recorded data or information. The mould blocks are usually adapted to heat or cool the stamper plates depending upon the particular phase in the pressing cycle.

The stamper plates, which can be derived directly from a lacquer master by an electroplating process are rarely perfectly formed and usually bear small nodules, typically a few microns in width, which project from the back, unmodulated, face of the stamper plate. Such nodules tend to be pressed through the stamper plates by the action of the record press and thus to cause blemishes (e.g. pit or holes) in the surface of a pressed disc record. Commonly, in an attempt to minimise this problem, each stamper plate, prior to use in the press, is mounted for rotation about a horizontal axis and its back face is 'sanded', manually, using progressively finer grades of abrasive paper. This 'sanding' procedure, which has been adopted for the past 20 to 25 years, is both time consuming and potentially hazardous and can often result in irrovocable damage to the stamper plate due to the extensive handling. Furthermore although some improvement in the surface regularity and flatness is achieved, imperfections still persist and sanding lines, detectable in the pressed record, are sometimes generated.

Once sanded, the plate is usually shaped to fit a press mould block and its edges are trimmed and the central hole cleared. The shaped stamper plate is then mounted on a respective press mould block primarily by the use of a clamp ring adapted to engage the plate at its periphery. In addition, a glue is commonly applied to the sanded back surface of the stamper plate in order to enhance the bond between the plate and mold block and also to a limited extent, to reduce the effect of the sanding lines and residual imperfections. Glues suitable for application to a stamper plate are unfortunately toxic and are typically applied by means of an aerosol spray and consequently their use in the press room is generally undesirable.

The glue also tends to leave a residue on the mould block which has to be removed prior to a subsequent pressing. Removal is however difficult and involves the use of toxic solvents which is again undesirable.

Despite the time consuming and costly procedures outlined above the disc records produced bear numerous surface blemishes and imperfections which are detectable by eye and can impair the quality of sound reproduction.

It is therefore an object of the present invention to provide an improved technique for the production of disc records which substantially overcomes the above mentioned longstanding problems.

Accordingly there is provided a method of manufacturing a modulated disc record comprising the steps of:

providing a stamper plate bearing modulations at one surface only representing a negative impression of the information or data to be recorded, securing the stamper plate between the rams of a press and then moulding a thermoplastics material, interposed between the rams, so as to impart thereto a positive impression of said data or information, the method being *characterised in that* before the stamper plate is so secured a plastics material foil is disposed between the unmodulated surface of the stamper plate and the ram.

In order that the invention may be more clearly understood and carried into effect examples thereof are now described by reference to the accompanying drawing which shows an exploded, side-sectional view of a record press useful in understanding the moulding procedure.

Referring to the drawing a pair of mould blocks, shown at 10 and 11, are mounted to the rams R of a press and stamper plates, bearing modulations at their inwardly facing surfaces are shown at 12 and 13.

In accordance with an example of the invention a thin adhesive backed foil of a plastics material shown at 14 and 15 is applied, using a roller, to the unmodulated back surface of a freshly prepared stamper plate. Alternatively the foil could be applied to the associated mould block. The foil, which remains in position during the entire pressing operation, should preferably satisfy certain criteria and particular foils having especially suitable specifications are described below. It will be appreciated, however, that other foils not described herein, but fulfilling the aim of the invention, may alternatively be used.

Before mounting a stamper plate to a press mould block a central hole is blanked out in the plastic foil and the outer edge of the stamper plate is trimmed. After centreing, using a conventional optical technique, the stamper plate together with the attached plastics foil is shaped to fit the press mould block.

It has been found that due to the high degree of friction between the foil and mould block the stamper plate can be adequately mounted to the mould block using a clamp ring only, thereby obviating the need for toxic glues and solvents. Furthermore even though the back face of the stamper plate remains unsanded it has been found that the disc records produced have considerably fewer blemishes than those produced by the hitherto adopted techniques described earlier.

It has been found that the plastics foil should preferably satisfy certain criteria regarding composition and thickness. In particular the foil must be capable of withstanding a temperature of at least 170° C. (the maximum temperature achieved by a mould block during pressing) without melting, shrinking or substantially softening. It has been found, for example, that PVC is relatively unsatisfactory since it tends to distort at the relatively high temperatures used. It has also been found that if the foil is too thick (0.125 mm, say) there occurs a departure from the general flatness of the pressed record, whilst if the foil is too thin (0.025 mm say) imperfections on the recorded back surface of the stamper plate tend to engage the mould block through the foil and are consequently reflected as blemishes in the pressed disc record.

Foils having a variety of compositions and thicknesses have been used and the specifications of particularly suitable foils, which satisfy these preferred criteria are set out below, by way of example only.

EXAMPLE 1

A cross-linked polyester foil, supplied by Fasson Ltd., and having the trade name Fascal 772 was used. This foil has an aluminium film applied at one surface and was bonded to the stamper plate so that the metallised film lay closest thereto. Foils having thicknesses in the range 0.050 mm to 0.075 mm were used, a thickness at or close to 0.075 mm proving the most satisfactory. The adhesive used to bond the foil to a stamper plate, which was preapplied to the foil and which was also supplied by Fasson Ltd., had the tradename S288.

EXAMPLES 2 and 3

Two other specifications and aluminised cross-linked polyester foils were also tested, these foils being produced by Flexcon Co., of Oxford under trade name Flexvic MM 200-Metsilver and Flexvic MM 300 Brite Brush Stainless respectively. Respective foil thickness of 0.050 mm and 0.075 mm were used and these were found to result in substantially blemish free moulded discs of a most satisfactory quality.

EXAMPLE 4

A polycarbonate, non metalised foil, having a thickness 0.125 mm was tested and the moulded discs had at least the quality of the discs produced using the foils of the above-cited examples. This polycarbonate foil was also produced by Flexcon Co., and had the tradename Flexvic OL500.

As mentioned above, other foils, having alternative specifications, which fulfil the aim of the invention could be used.

By adopting the technique of the present invention the use of toxic glues and solvents has been obviated. Moreover despite the elimination of the time consuming and hazardous sanding operation, disc records having fewer imperfections and blemishes are produced. It has also been found that particularly when the stamper plate and the mould block are ill matched a tendency for the stamper plate to stretch during moulding is inhibited by the cushioning effect of the plastics foil provided in accordance with the invention, thereby tending to greatly increase the life of the stamper plate (by a factor of about five). Furthermore if a stamper plate is reused in a subsequent pressing run the foil may be left in position on the stamper plate thereby considerably simplifying its restoration and reducing the down time of the press. Since the use of glue in the press room is eliminated it is merely necessary to clean the mould block and the modulated surface of the stamper plate using a jet of dry air. Moreover it will be appreciated that the above-described procedure may be used in the preparation of either audio or video discs.

What I claim is:

1. A method of manufacturing a modulated disc record comprising the steps of, providing a stamper plate bearing modulations at one surface only representing information or data to be recorded, securing the stamper plate between mould blocks mounted between the rams of a press and then moulding a recording medium comprised solely of a thermoplastics material to impart thereto a positive impression of the data or information, the method being characterised in that before the stamper plate is so secured a plastics material foil is bonded to the unmodulated surface of the stamper plate or to the surface of the mould block facing the stamper plate.

2. A method according to claim 1 wherein the foil has a metalised film at the surface thereof lying closest to the stamper plate.

3. A method according to claim 1 or claim 2 wherein the foil is made of a polyester or polycarbonate material.

4. A method according to claim 1 or claim 3 wherein the foil has a thickness in the range 0.025 mm to 0.125 mm.

5. A method according to claim 4 wherein the foil has a thickness in thr range 0.050 mm to 0.100 mm.